J. BALINT.
GARDEN SEED PLANTER.
APPLICATION FILED AUG. 11, 1910.
988,539.
Patented Apr. 4, 1911.
2 SHEETS—SHEET 2.
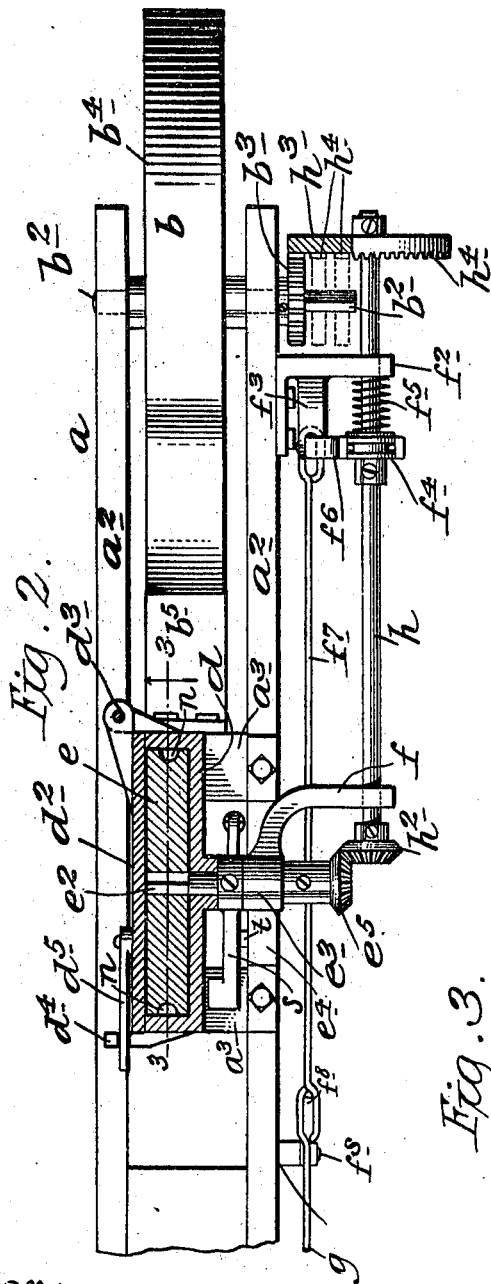
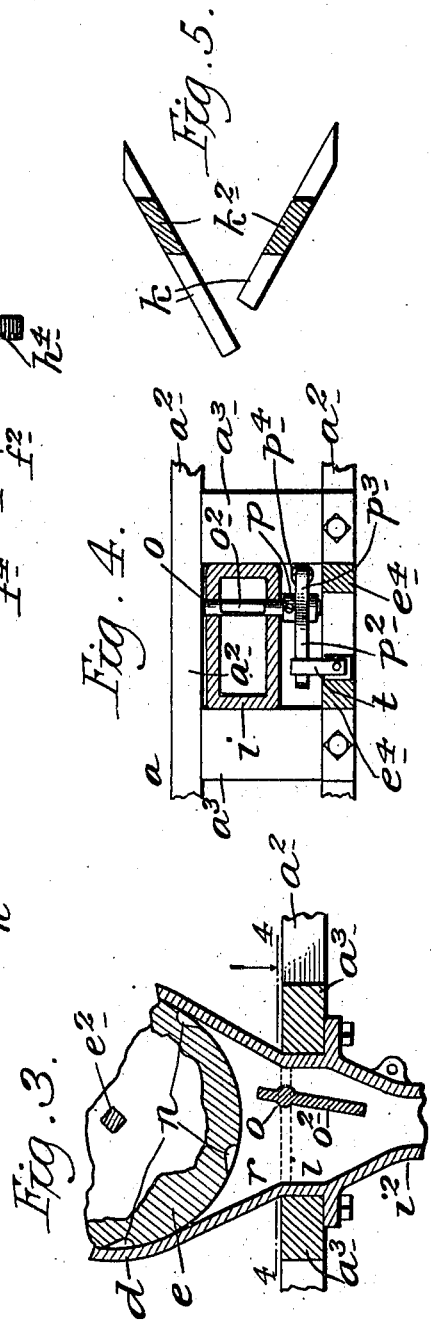
Witnesses:
N. R. Appleman
B. M. Ryerson
Inventor.
Joseph Balint.
By Edgar Tate &c. Att'ys.

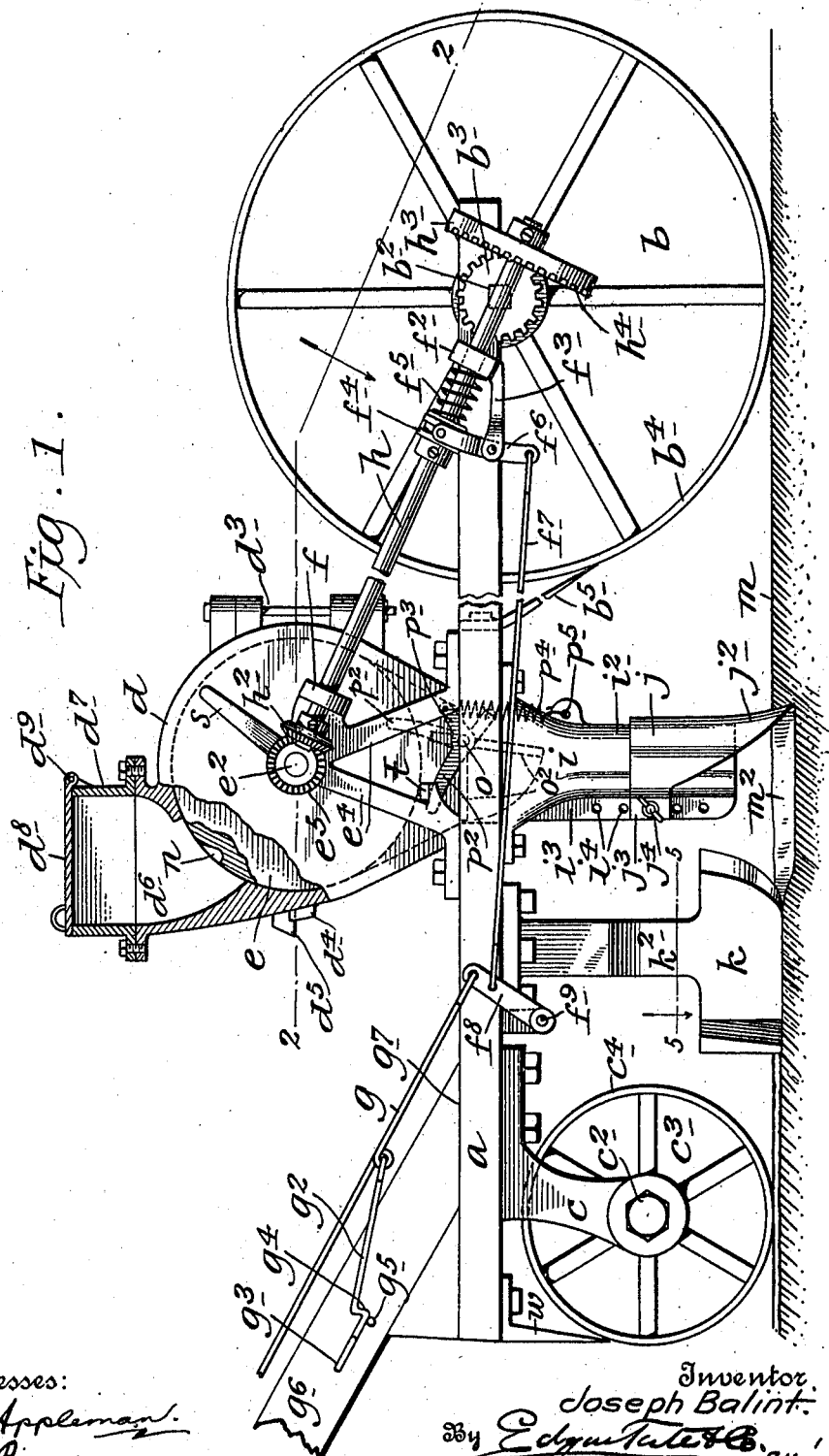

UNITED STATES PATENT OFFICE.

JOSEPH BALINT, OF NEW BRUNSWICK, NEW JERSEY.

GARDEN-SEED PLANTER.

988,539.

Specification of Letters Patent.

Patented Apr. 4, 1911.

Application filed August 11, 1910. Serial No. 576,746.

*To all whom it may concern:*

Be it known that I, JOSEPH BALINT, a citizen of the United States, and residing at New Brunswick, in the county of Middlesex and State of New Jersey, have invented certain new and useful Improvements in Garden-Seed Planters, of which the following is a specification, such as will enable those skilled in the art to which it appertains to make and use the same.

This invention relates to garden seed planters or droppers, and the object thereof is to provide an improved device of this class which is particularly designed for planting or dropping garden seed in rows, and at intervals, either one seed at a time, or a greater number at a time; a further object being to provide a seed planter of the class specified which while being especially designed as a garden seed planter may also be used on a larger scale for planting corn, or other grains; and with these and other objects in view the invention consists in a device or machine of the class specified, constructed as hereinafter described and claimed.

The invention is fully disclosed in the following specification, of which the accompanying drawing forms a part, in which the separate parts of my improvement are designated by suitable reference characters in each of the views, and in which:—

Figure 1 is a side view of my improved seed planter with part of the construction shown in section; Fig. 2 a sectional plan view of the construction shown in Fig. 1, the section being on the line 2—2 of Fig. 1; Fig. 3 a partial section on the line 3—3 of Fig. 2; Fig. 4 a section on the line 4—4 of Fig. 3; and, Fig. 5 a section on the line 5—5 of Fig. 1.

In the practice of my invention, as shown in the drawing, I provide a truck frame $a$ composed of two parallel side members $a^2$ connected by cross members $a^3$, or in any desired manner, and in the front end portion of which is mounted a wheel $b$, the axle $b^2$ of which is provided at one end with a gear is adjustable thereon, as indicated in wheel $b$ on which the gear $b^3$ is mounted is preferably angular in cross section, and said gear is adjustable thereon, as indicated in dotted lines in Fig. 2. The wheel $b$ serves as a guide and track wheel and is preferably provided with a comparatively wide rim $b^4$, and secured to the truck frame rearwardly thereof is a scraper $b^5$ which operates to prevent the accumulation of dirt on the rim of said wheel.

At the rear end of the truck frame $a$ are hangers or supports $c$ through which passes the axle $c^2$ of a wheel $c^3$ which is much smaller than the wheel $b^2$, and the rim $c^4$ of which is preferably wider.

Supported on and centrally of the truck frame $a$ is a circular casing $d$, one side $d^2$ of which consists of a door hinged at $d^3$, and the body of said casing is provided opposite the hinge $d^3$ with a catch $d^4$ adapted to receive a latch $d^5$ pivoted to the door $d^2$, and the circular casing $d$, or the body portion thereof, is provided with a raised hopper-shaped receptacle $d^6$, the top portion $d^7$ of which is, in the form of construction shown, formed separately and connected with the body portion thereof, and provided with a cover $d^8$ which is hinged thereto at $d^9$.

Mounted in, and fitting in, the casing $d$ is a seed wheel $e$, the axle $e^2$ of which passes through the side of the body portion of said casing, and through a suitable bearing $e^3$ formed in connection with supports $e^4$ secured to the right hand side of the truck frame, and the end portion of the axle $e^2$ which passes through the bearing $e^3$ is provided with a beveled gear $e^5$.

The supports $e^4$, or the bearing $e^3$, is provided with a laterally directed arm $f$, and connected with the right hand side of the truck frame rearwardly of the bearings of the axle $b^2$ of the wheel $b$ is an outwardly directed bracket $f^2$ having a forwardly directed arm $f^3$, and mounted in the arm $f^3$ and bracket $f^2$ is a longitudinally movable shaft $h$ to which is secured a collar $f^4$, between which and bracket $f^2$ is placed a spiral spring $f^5$, and the collar $f^4$ is provided with an inwardly directed arm $f^6$, with which is connected a rod $f^7$, which extends backwardly and is connected with a crank $f^8$ pivoted below the truck frame at $f^9$, and connected with the crank $f^8$ is a rod $g$ with which is connected a catch device $g^2$, consisting of a rod having a handle $g^3$ and a hook member $g^4$ adapted to engage a pin $g^5$ secured to one member of a pair of arms $g^6$ which are secured to the truck frame at $g^7$ in any desired manner, and which extend backwardly, and upwardly, and by means of which the machine is operated.

The shaft $h$ is downwardly and forwardly inclined and is normally held in the position shown in Figs. 1 and 2 by the spring $f^5$, and the said shaft $h$ is provided at its rear end with a beveled gear $h^2$ which is adapted to engage the bevel gear $e^5$, and at its front end with a face gear $h^3$, the inner face of which is provided with a plurality of circularly and concentrically arranged rows of teeth $h^4$ with either row of which the gear $b^3$ on the axle $b^2$ of the wheel $b$ is adapted to engage, as clearly shown in Fig. 2, and by means of this construction, the speed of the shaft $h$ which is driven by the wheel $b$ may be increased or decreased as may be desired, as may also the speed of the wheel $e$ in the casing $d$.

As hereinbefore stated, the shaft $h$ is normally in the position shown in Figs. 1 and 2, but whenever desired, the rod $g$, the crank $f^8$ and the rod $f^7$ may be manipulated by means of said rod $g$ to slide the shaft $h$ forwardly, said rod $g$ being pulled backwardly in this operation, and at this time the catch $g^2$ will engage the pin or stop $g^5$ and hold said shaft $h$ and gear $h^2$ out of engagement with the axle $e^2$ of the wheel $e$ in the casing $d$ and the axle $b^2$ of the wheel $b$.

The circular casing $d$ in which the wheel $e$ is mounted is provided with a downwardly directed extension $i$ which passes through the truck frame $a$, and the lower end portion $i^2$ of which is tubular in form, and mounted thereon is a sleeve $j$ provided with a downwardly and forwardly directed furrow shovel $j^2$, and the downwardly directed tubular member $i^2$ of the extension $i$ of the casing $d$ is provided at the back with a longitudinal flange or rib $i^3$ having equally spaced holes $i^4$, and the sleeve $j$ is provided at the back with jaws $j^3$ between which the flange or rib $i^3$ passes, and through which is passed a pin or bolt $j^4$, and by means of this construction the sleeve $j$ and the shovel member $j^2$ thereof may be vertically adjustable, as will be readily understood.

Rearwardly of the parts $i^2$, $j$ and $j^2$ are laterally and forwardly directed shovels $k$ having shanks $k^2$ by which they are secured to, and suspended from, the truck frame $a$, and in practice, the shovel member $j^2$, in the operation of the machine, forms in the ground $m$ over which the machine is passed a small furrow $m^2$ in which the seeds are dropped and the shovel members $k$ which follow the shovel $j^2$ throw the dirt back onto and cover said seeds, as will be readily understood.

Formed in the face of the wheel $e$, which is rotatable in the casing $d$, are spaced recesses $n$, three of which are shown in Fig. 3, and two in Fig. 2, and these recesses are adapted to receive seeds placed in the hopper member $d^6$, and as the machine is operated, or moved forwardly, the wheel $e$ is rotated and the seeds will be successively dropped from the recesses $n$ and will pass down through the extension $i$ of the casing $d$ and through the downwardly directed tubular member $i^2$ of said extension and into the furrow $m^2$, and the number of recesses $n$ in the face of the wheel $e$ will fix the intervals of space in which the seeds are dropped into the furrow $m^2$, and said recesses may be so formed as to receive but one seed, or they may be so formed as to receive two or more seeds, and the number of seeds dropped at a single time into the furrow $m^2$ will be determined by the size of the recesses $n$ and the size of said seeds. Whenever it is desired, however, to drop more than one seed in a place, or in a hill, I prefer to employ the following construction. Passing transversely through the bottom portion of the casing $d$ and at the top of the extension $i$ thereof, is a shaft $o$ provided with a damper or valve plate $o^2$, which is preferably rectangular in form, while the extension $i$ of the casing $d$ is also preferably rectangular in cross section as shown in Fig. 4, and the shaft $o$ is provided at one end, the right hand end as shown in the drawing, with a collar $p$ having a long arm $p^2$ and a short arm $p^3$, and secured to the short arm $p^3$ is a spring $p^4$ which is also secured to the downwardly directed tubular member $i^2$ of the extension $i^3$ of the casing $d$ at $p^5$, and this spring normally holds the valve plate or damper $o^2$ in the closed position, as shown in dotted lines in Figs. 1 and 3, with the longer arm $p^2$ directed upwardly, and this forms in the bottom of the casing $d$ a chamber $r$. The axle $e^2$ of the wheel $e$ is provided with an arm $s$, and at each complete revolution of said wheel, the arm $s$ will strike the arm $p^2$ and the shaft $o$ will be turned into the position shown in full lines in Fig. 3, and the seeds dropped from the wheel $e$ onto the valve plate or damper $o^2$ will be discharged, as will be readily understood, and the number of said seeds so discharged will depend upon the number of the recesses $n$ in the wheel $e$.

When it is not desired to drop the seeds in hills, or a number in a place, the arm $p^2$ is turned into the position shown in full lines in Fig. 1, where it is held by a catch $t$ pivoted to one of the supports $e^4$, and this holds the damper or valve plate $o^2$ in the position shown in full lines in Fig. 3, and the seed or seeds will be deposited or dropped at intervals depending on the number of recesses $n$ in the wheel $e$.

My improved planter or seeder is operated by means of the handles $g^6$, said handles being grasped by the operator, and the machine being pushed forwardly in front of him and in this way the seeds are dropped in a straight furrow formed by the shovel $j^2$ and the said seeds are covered by the shovels $k$, and the rear truck wheel $c^3$ while operating as one support for the machine also follows the shovels $k$ and presses the dirt down onto the seeds in the furrow $m^2$.

While I have shown and described my improved planting machine, as particularly designed for being operated by hand, and for planting garden seeds, it will be apparent that the said machine may be made on a larger scale, if desired, and may be drawn by a horse or horses, or operated in other ways, and various changes in and modifications of the construction herein described may be made, within the scope of the appended claims, without departing from the spirit of my invention or sacrificing its advantages.

Having fully described my invention, what I claim as new and desire to secure by Letters Patent, is:—

1. In a seed planting machine, a truck frame provided with front and rear wheels, a circular casing supported on said frame between said wheels and provided at the top thereof with a hopper adapted to receive seeds, said casing being also provided with a downwardly directed extension through which said seeds are adapted to pass and on which is mounted a vertically adjustable furrow shovel, seed covering shovels arranged rearwardly of the furrow shovel, a seed wheel rotatably mounted in said casing, the face of which is provided with recesses adapted to receive seeds from said hopper, a longitudinally movable shaft normally geared in connection with the axle of the seed wheel and the axle of the front truck wheel, and means for throwing said shaft out of engagement with said axles.

2. In a seed planting machine, a truck frame provided with front and rear wheels, a casing supported on said frame between said wheels and provided at the top thereof with a hopper and at the bottom thereof with a downwardly directed extension through which the seeds are adapted to pass, and which is provided with a vertically adjustable furrow shovel, seed covering shovels supported rearwardly of the furrow shovel, a seed wheel mounted in said casing, and the face of which is provided at intervals with recesses adapted to receive seeds from said hopper, and means for gearing the seed wheel in connection with the front truck wheel, said means consisting of a longitudinally movable shaft provided with gears which operate in connection with gears on the axles of the seed wheel and the said truck wheel, and means for throwing said shaft out of engagement with said axles.

3. In a seed planting machine, a truck frame provided with front and rear wheels, a circular casing supported on said frame between said wheels and provided at the top thereof with a hopper, said casing being also provided with a downwardly directed extension through which seeds are adapted to pass and on which is mounted a vertically adjustable furrow shovel, seed covering devices arranged rearwardly of the furrow shovel, a seed wheel rotatably mounted in said casing and the face of which is provided with recesses adapted to receive seeds from said hopper, a longitudinally movable shaft normally geared in connection with the axle of the seed wheel and the axle of one of the truck wheels, a tensional device for holding said shaft in operative position and means for moving said shaft longitudinally and throwing it out of operative position.

In testimony that I claim the foregoing as my invention I have signed my name in presence of the subscribing witnesses this 9th day of August 1910.

JOSEPH BALINT.

Witnesses:
JOSEPH MEZEY,
KUKOR ISTVÁN.

---

Copies of this patent may be obtained for five cents each, by addressing the "Commissioner of Patents, Washington, D. C."